US012353002B2

(12) United States Patent
Malviya et al.

(10) Patent No.: US 12,353,002 B2
(45) Date of Patent: Jul. 8, 2025

(54) OPTICAL FIBER WITH IMPROVED MICROBENDING PERFORMANCE

(71) Applicant: Sterlite Technologies Limited, Gurugram (IN)

(72) Inventors: Apeksha Malviya, Gurugram (IN); Ranjith Balakrishnan, Gurugram (IN); Srinivas Reddy Munige, Gurugram (IN); Anand Pandey, Gurugram (IN)

(*) Notice: Subject to any disclaimer, the term of this patent is extended or adjusted under 35 U.S.C. 154(b) by 114 days.

(21) Appl. No.: 18/340,848

(22) Filed: Jun. 24, 2023

(65) Prior Publication Data

US 2024/0210616 A1 Jun. 27, 2024

(30) Foreign Application Priority Data

Dec. 22, 2022 (IN) .............................. 202211074534

(51) Int. Cl.
*G02B 6/02* (2006.01)
*C03C 25/1065* (2018.01)

(52) U.S. Cl.
CPC ..... *G02B 6/02395* (2013.01); *G02B 6/02009* (2013.01); *C03C 25/1065* (2013.01)

(58) Field of Classification Search
CPC ........... G02B 6/02395; G02B 6/02009; C03C 25/1065
See application file for complete search history.

(56) References Cited

U.S. PATENT DOCUMENTS

| | | | | |
|---|---|---|---|---|
| 6,421,491 B1* | 7/2002 | Liu | ..................... | G02B 6/03666 385/127 |
| 6,701,053 B2* | 3/2004 | Liu | ....................... | G02B 6/0286 385/127 |
| 7,187,833 B2* | 3/2007 | Mishra | ................ | G02B 6/02242 385/127 |
| 7,254,305 B2* | 8/2007 | Mishra | ................ | G02B 6/0365 385/127 |
| 7,450,807 B2* | 11/2008 | Bickham | ............. | G02B 6/0365 385/127 |
| 7,555,186 B2* | 6/2009 | Flammer | ............ | G02B 6/03694 385/127 |
| 7,587,111 B2* | 9/2009 | de Montmorillon | ........................ | G02B 6/03688 385/127 |
| 7,603,015 B2* | 10/2009 | Bickham | ............ | G02B 6/02014 385/127 |

(Continued)

OTHER PUBLICATIONS

Hsueh et al., Microbending losses in double-coated optical fibers caused by axial strain-induced creep deformation of polymeric coatings. J. Appl. Phys. Sep. 1, 2010; 108 (5): 053519. https://doi.org/10.1063/1.34810 (Year: 2010).*

*Primary Examiner* — Peter Radkowski
(74) *Attorney, Agent, or Firm* — Steven R. Fairchild (57) ABSTRACT

The present invention relates to an optical fiber (100, 120, 142) comprising a silica region (102, 122, 144), a first coating (104, 124, 146), and a second coating (106, 126, 148). The first coating (104, 124, 146) is adapted to cover an outer circumference of the silica region (102, 122, 144). The second coating (106, 126, 148) adapted to cover an outer surface of the first coating (104, 124, 146). Moreover, the first coating (104, 124, 146) and the second coating (106, 126, 148) are adapted to cause a coating induced micro bend loss that is less than $2.2 \times 10^3$ $N^{-1}$ $mm^{-8.5}$.

12 Claims, 7 Drawing Sheets

(56) References Cited

U.S. PATENT DOCUMENTS

| | | | |
|---|---|---|---|
| 7,620,282 B2* | 11/2009 | Bickham | G02B 6/0365 385/124 |
| 7,676,129 B1* | 3/2010 | Bookbinder | G02B 6/0365 385/127 |
| 7,889,960 B2* | 2/2011 | de Montmorillon | G02B 6/0365 385/127 |
| 7,894,698 B2* | 2/2011 | Flammer | G02B 6/0365 385/127 |
| 7,899,293 B2* | 3/2011 | de Montmorillon | G02B 6/03688 385/127 |
| 7,903,917 B2* | 3/2011 | Bickham | G02B 6/0365 385/124 |
| 8,041,172 B2* | 10/2011 | Sillard | G02B 6/02019 385/124 |
| 8,055,110 B2* | 11/2011 | Coon | G02B 6/02333 385/124 |
| 8,081,853 B2* | 12/2011 | Overton | C03C 25/106 385/100 |
| 8,103,143 B2* | 1/2012 | de Montmorillon | G02B 6/03688 385/127 |
| 8,131,125 B2* | 3/2012 | de Montmorillon | G02B 6/0365 385/127 |
| 8,145,025 B2* | 3/2012 | de Montmorillon | G02B 6/0365 385/127 |
| 8,145,026 B2* | 3/2012 | Overton | C03C 25/106 385/103 |
| 8,145,027 B2* | 3/2012 | Overton | C03C 25/106 385/127 |
| 8,165,439 B2* | 4/2012 | Overton | G02B 6/02395 385/113 |
| 8,265,442 B2* | 9/2012 | Overton | G02B 6/02395 385/100 |
| 8,290,324 B2* | 10/2012 | Sillard | G02B 6/0365 385/126 |
| 8,385,705 B2* | 2/2013 | Overton | C03C 25/105 385/127 |
| 8,428,411 B2* | 4/2013 | de Montmorillon | G02B 6/0281 385/127 |
| 8,428,414 B2* | 4/2013 | de Montmorillon | G02B 6/0365 385/127 |
| 8,467,650 B2* | 6/2013 | Overton | G02B 1/046 385/100 |
| 8,472,770 B2* | 6/2013 | Fini | G02B 6/03688 385/127 |
| 8,520,995 B2* | 8/2013 | Richard | G02B 6/02019 385/135 |
| 8,588,569 B2* | 11/2013 | Bookbinder | G02B 6/03638 385/124 |
| 8,600,206 B2* | 12/2013 | Overton | G02B 6/02395 385/100 |
| 8,666,214 B2* | 3/2014 | Bookbinder | G02B 6/0365 385/124 |
| 8,682,127 B2* | 3/2014 | Fini | G02B 6/03688 385/127 |
| 8,798,423 B2* | 8/2014 | Sillard | C03B 37/01211 385/127 |
| 8,798,424 B2* | 8/2014 | Bigot-Astruc | G02B 6/03661 385/127 |
| 8,849,082 B2* | 9/2014 | Bookbinder | G02B 6/03666 385/127 |
| 8,891,925 B2* | 11/2014 | Bickham | G02B 6/0365 385/127 |
| 8,953,917 B2* | 2/2015 | Berkey | G02B 6/0286 385/127 |
| 9,020,316 B2* | 4/2015 | Bookbinder | G02B 6/03627 385/124 |
| 9,057,813 B2* | 6/2015 | Sato | G02B 6/03683 |
| 9,618,692 B2* | 4/2017 | Berkey | C03C 13/046 |
| 9,658,394 B2* | 5/2017 | Bookbinder | C03B 37/027 |
| 9,798,079 B2* | 10/2017 | Bookbinder | G02B 6/02014 |
| 9,802,858 B2* | 10/2017 | Bookbinder | G02B 6/0288 |
| 9,851,501 B2* | 12/2017 | Bookbinder | G02B 6/0365 |
| 9,964,697 B2* | 5/2018 | Maruyama | G02B 6/125 |
| 10,048,438 B2* | 8/2018 | Bookbinder | G02B 6/02004 |
| 10,067,287 B2* | 9/2018 | Endo | G02B 6/03627 |
| 10,082,622 B2* | 9/2018 | Bookbinder | G02B 6/03672 |
| 10,094,975 B2* | 10/2018 | Bookbinder | G02B 6/03633 |
| 10,150,695 B2* | 12/2018 | Bookbinder | C03C 13/046 |
| 10,215,915 B2* | 2/2019 | Bookbinder | G02B 6/03611 |
| 10,228,509 B2* | 3/2019 | Bookbinder | G02B 6/02014 |
| 10,274,674 B2* | 4/2019 | Bookbinder | G02B 6/03644 |
| 10,295,733 B2* | 5/2019 | De Montmorillon | G02B 6/0281 |
| 10,302,857 B2* | 5/2019 | Bookbinder | G02B 6/0286 |
| 10,422,948 B2* | 9/2019 | Maruyama | G02B 6/03627 |
| 10,422,949 B2* | 9/2019 | Maruyama | G02B 6/0281 |
| 10,429,579 B2* | 10/2019 | Berkey | G02B 6/03627 |
| 10,444,427 B2* | 10/2019 | Bookbinder | G02B 6/02009 |
| 10,591,668 B2* | 3/2020 | Bookbinder | G02B 6/03633 |
| 10,620,393 B2* | 4/2020 | Bookbinder | G02B 6/4486 |
| 10,649,163 B2* | 5/2020 | Bookbinder | G02B 6/03672 |
| 10,852,473 B2* | 12/2020 | Pastouret | G02B 6/03694 |
| 10,948,674 B2* | 3/2021 | Bookbinder | G02B 6/4478 |
| 10,962,708 B2* | 3/2021 | de Montmorillon | G02B 6/0281 |
| 11,125,938 B2* | 9/2021 | Bookbinder | G02B 6/03672 |
| 11,237,321 B2* | 2/2022 | Berkey | C03B 37/01869 |
| 11,243,348 B2* | 2/2022 | Brown | C03C 25/106 |
| 11,287,567 B2* | 3/2022 | Bickham | G02B 6/02004 |
| 11,360,280 B2* | 6/2022 | Bookbinder | G02B 6/02395 |
| 11,493,715 B2* | 11/2022 | Bookbinder | G02B 6/448 |
| 11,506,834 B2* | 11/2022 | Mishra | G02B 6/4403 |
| 11,513,284 B2* | 11/2022 | Pastouret | G02B 6/02395 |
| 11,579,359 B2* | 2/2023 | Bennett | C03C 13/045 |
| 11,675,124 B2* | 6/2023 | Li | C03C 25/002 385/124 |
| 11,675,125 B2* | 6/2023 | Li | G02B 6/0286 385/126 |
| 11,714,227 B2* | 8/2023 | Malaviya | G02B 6/028 385/124 |
| 11,719,878 B2* | 8/2023 | Lanke | G02B 6/02395 385/123 |
| 11,796,749 B2* | 10/2023 | Bookbinder | G02B 6/4404 |
| 11,860,407 B2* | 1/2024 | Mukasa | G02B 6/02004 |
| 12,032,203 B2* | 7/2024 | Munige | G02B 6/02395 |
| 2002/0141719 A1* | 10/2002 | Liu | G02B 6/02266 385/127 |
| 2005/0244120 A1* | 11/2005 | Mishra | G02B 6/02014 385/127 |
| 2007/0053642 A1* | 3/2007 | Mishra | G02B 6/0365 385/127 |
| 2007/0280615 A1* | 12/2007 | de Montmorillon | G02B 6/03688 385/127 |
| 2008/0056654 A1* | 3/2008 | Bickham | G02B 6/0365 385/124 |
| 2008/0056658 A1* | 3/2008 | Bickham | G02B 6/0365 385/127 |
| 2008/0152288 A1* | 6/2008 | Flammer | G02B 6/0365 385/124 |
| 2008/0304800 A1* | 12/2008 | Bickham | G02B 6/02014 385/127 |
| 2009/0175583 A1* | 7/2009 | Overton | C03C 25/106 385/100 |
| 2009/0263092 A1* | 10/2009 | Flammer | G02B 6/0365 385/127 |
| 2009/0279835 A1* | 11/2009 | de Montmorillon | G02B 6/0365 385/127 |

(56) References Cited

U.S. PATENT DOCUMENTS

| | | | |
|---|---|---|---|
| 2009/0279836 A1* | 11/2009 | de Montmorillon | G02B 6/0365 385/127 |
| 2010/0021117 A1* | 1/2010 | de Montmorillon | G02B 6/03688 385/127 |
| 2010/0046899 A1* | 2/2010 | Bickham | G02B 6/0365 385/124 |
| 2010/0092138 A1* | 4/2010 | Overton | C03C 25/106 385/113 |
| 2010/0119202 A1* | 5/2010 | Overton | C03C 25/106 385/100 |
| 2010/0124396 A1* | 5/2010 | Coon | G02B 6/02333 385/125 |
| 2010/0135623 A1* | 6/2010 | Overton | G02B 1/048 385/100 |
| 2010/0135624 A1* | 6/2010 | Overton | G02B 6/02395 385/103 |
| 2010/0189397 A1* | 7/2010 | Richard | G02B 6/02366 385/123 |
| 2010/0189399 A1* | 7/2010 | Sillard | G02B 6/03644 385/126 |
| 2010/0290781 A1* | 11/2010 | Overton | C03C 25/106 385/100 |
| 2011/0026891 A1* | 2/2011 | Fini | G02B 6/03688 385/127 |
| 2011/0044595 A1* | 2/2011 | Sillard | G02B 6/02019 385/124 |
| 2011/0069932 A1* | 3/2011 | Overton | G02B 6/4433 385/100 |
| 2011/0135264 A1* | 6/2011 | de Montmorillon | G02B 6/0365 385/127 |
| 2011/0164852 A1* | 7/2011 | de Montmorillon | G02B 6/03688 385/127 |
| 2011/0229101 A1* | 9/2011 | de Montmorillon | G02B 6/0365 385/124 |
| 2012/0040184 A1* | 2/2012 | de Montmorillon | C03B 37/0124 65/412 |
| 2012/0183268 A1* | 7/2012 | de Montmorillon | G02B 6/0365 385/124 |
| 2012/0189258 A1* | 7/2012 | Overton | C03C 25/105 385/124 |
| 2012/0301093 A1* | 11/2012 | Sillard | G02B 6/03666 427/163.2 |
| 2012/0315006 A1* | 12/2012 | Bigot-Astruc | C03B 37/01807 427/163.2 |
| 2013/0044987 A1* | 2/2013 | Bickham | G02B 6/0281 385/123 |
| 2013/0136405 A1* | 5/2013 | Bookbinder | G02B 6/03633 385/124 |
| 2013/0136406 A1* | 5/2013 | Bookbinder | G02B 6/0365 385/124 |
| 2013/0136407 A1* | 5/2013 | Berkey | G02B 6/0286 385/124 |
| 2013/0136408 A1* | 5/2013 | Bookbinder | G02B 6/0285 385/124 |
| 2013/0243949 A1* | 9/2013 | Fini | G02B 6/03688 427/163.2 |
| 2013/0272668 A1* | 10/2013 | Sato | G02B 6/03683 385/123 |
| 2014/0086548 A1* | 3/2014 | Overton | C03C 25/106 385/141 |
| 2014/0241684 A1* | 8/2014 | Bookbinder | G02B 6/02019 385/124 |
| 2015/0370010 A1* | 12/2015 | Bookbinder | C03C 13/046 65/435 |
| 2016/0011365 A1* | 1/2016 | Berkey | G02B 6/02014 385/127 |
| 2016/0304392 A1* | 10/2016 | Bookbinder | G02B 6/03627 |
| 2017/0031089 A1* | 2/2017 | De Montmorillon | G02B 6/0365 |
| 2017/0075061 A1* | 3/2017 | Bookbinder | G02B 6/03644 |
| 2017/0168231 A1* | 6/2017 | Berkey | C03B 37/0183 |
| 2017/0219770 A1* | 8/2017 | Bookbinder | C03C 13/046 |
| 2017/0285257 A1* | 10/2017 | Maruyama | G02B 6/03627 |
| 2017/0285260 A1* | 10/2017 | Bookbinder | G02B 6/03672 |
| 2017/0336558 A1* | 11/2017 | Endo | G02B 6/02009 |
| 2018/0002221 A1* | 1/2018 | Bookbinder | C03C 13/045 |
| 2018/0024291 A1* | 1/2018 | Bookbinder | G02B 6/0281 385/124 |
| 2018/0031761 A1* | 2/2018 | Bookbinder | G02B 6/03633 |
| 2018/0031762 A1* | 2/2018 | Bookbinder | G02B 6/03666 |
| 2018/0067256 A1* | 3/2018 | Bookbinder | G02B 6/02395 |
| 2018/0095219 A1* | 4/2018 | Bookbinder | G02B 6/02004 |
| 2018/0321438 A1* | 11/2018 | Bookbinder | G02B 6/02219 |
| 2018/0335565 A1* | 11/2018 | Bookbinder | G02B 6/03627 |
| 2019/0025503 A1* | 1/2019 | Maruyama | G02B 6/02009 |
| 2019/0049660 A1* | 2/2019 | Bookbinder | G02B 6/03633 |
| 2019/0049663 A1* | 2/2019 | Maruyama | G02B 6/02009 |
| 2019/0049681 A1* | 2/2019 | Bookbinder | G02B 6/4478 |
| 2019/0170934 A1* | 6/2019 | Pastouret | G02B 6/02342 |
| 2019/0293887 A1* | 9/2019 | Bookbinder | G02B 6/4494 |
| 2019/0361170 A1* | 11/2019 | Bickham | G02B 6/02009 |
| 2019/0369325 A1* | 12/2019 | Berkey | C03C 13/046 |
| 2020/0150336 A1* | 5/2020 | Bookbinder | G02B 6/03644 |
| 2020/0192023 A1* | 6/2020 | Brown | G02B 6/4483 |
| 2020/0249406 A1* | 8/2020 | Bookbinder | G02B 6/0365 |
| 2020/0319398 A1* | 10/2020 | de Montmorillon | G02B 6/0281 |
| 2021/0033780 A1* | 2/2021 | Malaviya | G02B 6/03694 |
| 2021/0048579 A1* | 2/2021 | Munige | G02B 6/02395 |
| 2021/0072458 A1* | 3/2021 | Pastouret | G02B 6/02342 |
| 2021/0132290 A1* | 5/2021 | Lanke | G02B 6/02 |
| 2021/0165178 A1* | 6/2021 | Bookbinder | G02B 6/4432 |
| 2021/0356661 A1* | 11/2021 | Bennett | G02B 6/12002 |
| 2021/0364690 A1* | 11/2021 | Mishra | G02B 6/03688 |
| 2021/0405286 A1* | 12/2021 | Li | G02B 6/0286 |
| 2022/0011503 A1* | 1/2022 | Li | G02B 6/0286 |
| 2022/0082753 A1* | 3/2022 | Mukasa | G02B 6/02004 |
| 2022/0269022 A1* | 8/2022 | Bookbinder | G02B 6/4478 |
| 2023/0049693 A1* | 2/2023 | Bookbinder | G02B 6/4432 |
| 2024/0027716 A1* | 1/2024 | Bookbinder | G02B 6/0281 |

* cited by examiner

OPTICAL FIBER WITH IMPROVED MICROBENDING PERFORMANCE

CROSS-REFERENCE TO RELATED APPLICATIONS

This application claims the benefit of Indian Application No. 202211074534 titled "OPTICAL FIBER WITH IMPROVED MICRO BENDING PERFORMANCE" filed by the applicant on Dec. 22, 2022, which is incorporated herein by reference in its entirety.

FIELD OF THE INVENTION

Embodiments of the present invention relate to optical communications and more particularly to an optical fiber with improved micro bending performance.

DESCRIPTION OF THE RELATED ART

Optical fiber as optical communication network underlying transport physical media can direct body to the improvement of its Transmission system performance Now in the improvement of OSNR (OSNR). The loss of optical fiber and nonlinear effect are limitation high-speed high-capacity fiber optic communication systems The key factor of system OSNR. Proved by correlative study, increase the effective area (A of optical fibereff), can not only be added to fine light Power, can also effectively reduce nonlinear effect. So increasing optical fiber effective area, it is to overcome fiber loss to reduce fiber loss With the main path of the two restraining factors of nonlinear effect.

Telecommunication systems for underground and undersea applications, require optical fibers that can transmit signals to longer distances without any degradation. However, the optical fiber attributes such as attenuation and bend loss can contribute to some degradation of the signals transmitted through the optical fiber.

Single mode fibers of G.652.D/G657A2 generally face major challenges in 400G transmission in territorial long haul communication systems due to non-linear effects, mainly in submarine application. Single mode fibers of G654E/G654C is specifically characterized by cut-off shifted, low attenuation, low latency, higher Optical Signal to Noise Ratio (OSNR) as compared to G.652.D/G657A2. Also, single mode fibers of G654E have large effective area and large Mode Field Diameter (MFD) as compared to G.652.D/G657A2.

The main component of telecommunication optical fiber is silica. In preform manufacturing process, typically by mixing dioxy Changing germanium and improve the refractive index of sandwich layer, and mix fluorine element reduces cladding index. By the effort of 40 years, prefabricated rods and light Fine manufacturing process has reached ultimate attainment. In addition to the Intrinsic Gettering of silica, the absorption and scattering of the germanium dioxide that adulterates It is the main source of telecommunication optical fiber decay, therefore the content for reducing sandwich layer germanium dioxide is the Main way for reducing optical fiber attenuation. Existing typical case is G.654 in Single Mode Fiber Design, although the refractive index of its sandwich layer and the content of germanium dioxide are substantially less than typical case G.652 optical fiber, but its mode field diameter, cutoff wavelength λcc. The further of sandwich layer germanium dioxide doping is limited with bending loss Decline.

Prior art reference CN106772788A discloses a kind of cut off wavelength displacement single-mode fiber having a sandwich layer, an inner cladding for coating successively, a depressed cladding, a middle covering and a surrounding layer. The single mode fiber provides properties such as low decay, large effective area and low bend loss, and can realize the controllability of fiber cut off wavelength.

Another prior art referenceUS20170003445A1 discloses an optical fiber with large effective area, low bending loss and low attenuation. The optical fiber includes a core, an inner cladding region, and an outer cladding region. The core region includes a spatially uniform up-dopant to minimize low Rayleigh scattering and a relative refractive index and radius configured to provide a large effective area. The inner cladding region features a large trench volume to minimize bending loss.

Yet another prior art reference US20130071080A1 discloses a trench-assisted optical fiber, optimized for figure-of-merit (FOM) performance, having a core region having a longitudinal axis, a shelf region surrounding said core region, a cladding region surrounding said shelf region, said core and shelf and cladding regions configured to support and guide the propagation of signal light in a fundamental transverse mode in said core and shelf regions in the direction of said axis, the cladding region including an inner trench and an outer trench.

Therefore, in the light of the above-stated discussion, there is a need to provide a technical solution that overcomes the aforementioned problems of the traditional single mode optical fibers by providing an optical fiber with higher cut-off wavelength, large effective area, large Mode Field Diameter (MFD), low attenuation, low latency, and higher Optical Signal to Noise Ratio (OSNR).

SUMMARY OF THE INVENTION

Embodiments of the present invention relates to an optical fiber comprising a silica region, a first coating adapted to cover an outer circumference of the silica region, a second coating adapted to cover an outer surface of the first coating. In particular, the first coating has a first diameter and a first Young's modulus. The second coating has a second diameter less than or equal to 180 μm and a second Young's modulus. Further, the first coating and the second coating (106, 126, 148) are adapted to cause a coating induced micro bend loss that is less than $2.2 \times 10^3 \text{ N}^{-1} \text{ mm}^{-8.5}$.

In accordance with an embodiment of the present invention, the silica region comprises a core, a trench layer, and a cladding. Further, the silica region comprises a core, a buffer layer, a trench layer, and a cladding In accordance with an embodiment of the present invention, the first Young's modulus is in a range of 0.0001 Gigapascal (GPa) to 0.0004 GPa, and the second Young's modulus is in a range of 1.3 GPa to 3 GPa.

In accordance with an embodiment of the present invention, a ratio of the second diameter to the first diameter is in a range of 1.05 to 1.45.

In accordance with an embodiment of the present invention, the optical fiber has a macro bend loss of less than or equal to 0.5 dB at a wavelength of 1550 nm, a bend radius of 7.5 mm, 1 turn and a macro bend loss of less than or equal to 1 dB at a wavelength1625 nm, a bend radius of 7.5 mm, 1 turn.

In accordance with an embodiment of the present invention, a macro bend loss of less than or equal to 0.2 dB at a wavelength of 1550 nm, a bend radius of 7.5 mm, 1 turn and macro bend loss of less than or equal to 0.5 dB at a wavelength of 1625 nm, a bend radius of 7.5 mm, 1 turn.

In accordance with an embodiment of the present invention, the optical fiber (100) has a macro bend loss of less than or equal to 0.1 dB at a wavelength of 1550 nm a bend radius of 10 mm, 1 turn and macro bend loss of less than or equal to 1 dB at a wavelength 1625 nm, a bend radius of 10 mm, 1 turn.

In accordance with an embodiment of the present invention, a leakage loss at a wavelength 1550 nm is less than a leakage loss at a wavelength 1625 nm, wherein the leakage loss at the wavelength of 1550 nm is less than 0.001 Decibels/Kilometers (dB/km).

In accordance with an embodiment of the present invention, the silica region has traces of at least one carbon group element and at least one halogen group element.

In accordance with an embodiment of the present invention, a refractive index $\Delta 1$ of a core (108) is in a range of 0.36 to 0.4, (ii) a refractive index $\Delta 4$ of a core (128) is in a range of 0.35 to 0.45, and (iii) a refractive index $\Delta 8$ of a core (150) is in a range of 0.35 to 0.45.

In accordance with an embodiment of the present invention, (i) a refractive index $\Delta 2$ of a trench layer (110) is in a range of −0.08 to −0.12, (ii) a refractive index $\Delta 6$ of a trench layer (132) is in a range of −0.28 to −0.35, and (iii) a refractive index $\Delta 10$ of a trench layer (154) is in a range of −0.0028 to −0.0035.

In accordance with an embodiment of the present invention, a Zero Dispersion Wavelength (ZDW) is in a range of 1300 nm to 1324 nm.

The foregoing objectives of the present invention are attained by employing a method of manufacturing a strength member for optical fiber cables.

BRIEF DESCRIPTION OF THE DRAWINGS

So that the manner in which the above-recited features of the present invention is understood in detail, a more particular description of the invention, briefly summarized above, is had by reference to embodiments, some of which are illustrated in the appended drawings. It is to be noted, however, that the appended drawings illustrate only typical embodiments of this invention and are therefore not to be considered limiting of its scope, for the invention admit to other equally effective embodiments.

The invention herein will be better understood from the following description with reference to the drawings, in which.

The optical fiber is illustrated in the accompanying drawings, which like reference letters indicate corresponding parts in the various figures. It should be noted that the accompanying FIGURE is intended to present illustrations of exemplary embodiments of the present invention. This FIGURE is not intended to limit the scope of the present invention. It should also be noted that the accompanying FIGURE is not necessarily drawn to scale.

DETAILED DESCRIPTION OF THE INVENTION

The principles of the present invention and their advantages are best understood by referring to FIG. 1A to FIG. 1F. In the following detailed description, numerous specific details are set forth in order to provide a thorough understanding of the embodiment of the invention as illustrative or exemplary embodiments of the invention, specific embodiments in which the invention is practiced are described in sufficient detail to enable those skilled in the art to practice the disclosed embodiments. However, it will be obvious to a person skilled in the art that the embodiments of the invention is practiced with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. is used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "," "might," "," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., is either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

Optical fiber refers to a medium associated with the transmission of information over long distances in the form of light pulses. The optical fiber uses light to transmit voice and data communications over long distances when encapsulated in a jacket/sheath. The optical fiber is of ITU.T G.657.A2 category. Alternatively, the optical fiber is of ITU.T G.657.A1 or G.657.B3 or G.652.D or other suitable categories. The ITU.T stands for International Telecommunication Union-Telecommunication Standardization Sector, is one of the three sectors of the ITU. The ITU is the United Nations specialized agency in the field of telecommunications and is responsible for studying technical, operating and tariff questions and issuing Recommendations on them with a view to standardizing telecommunications on a worldwide basis.

The term "core" of an optical fiber as used herein is referred to as the inner most cylindrical structure present in the center of the optical fiber, that is configured to guide the light rays inside the optical fiber.

The term "cladding" of an optical fiber as used herein is referred to as one or more layered structure covering the core of an optical fiber from the outside, that is configured to possess a lower refractive index than the refractive index of the core to facilitate total internal reflection of light rays inside the optical fiber. Further, the cladding of the optical fiber include an inner cladding layer coupled to the outer surface of the core of the optical fiber and an outer cladding layer coupled to the inner cladding from the outside.

The term "refractive index" as used herein is referred to as the measure of change of speed of light from one medium to another and is particularly measured in reference to speed of light in vacuum. More specifically, the refractive index facilitates measurement of bending of light from one medium to another medium.

The term refractive index profile" of an optical fiber as used herein is referred to as the distribution of refractive indexes in the optical fiber from the core to the outmost cladding layer of the optical fiber. Based on the refractive index profile, the optical fiber is configured as a step index fiber. The refractive index of the core of the optical fiber is constant throughout the fiber and is higher than the refractive index of the cladding. Further, the optical fiber is configured as a graded index fiber, wherein the refractive index of the core gradually varies as a function of the radial distance from the center of the core.

The term "leakage loss" as used herein refers to a loss due to mode leak in an optical fiber that adds to an attenuation of the optical fiber.

The term "micro bend loss" as used herein refers to a loss in an optical fiber that relates to a light signal loss associated with lateral stresses along a length of the optical fiber. The micro bend loss is due to coupling from the optical fiber's guided fundamental mode to lossy modes or cladding modes.

The term "macro bend loss" as used herein refers to losses induced in bends around mandrels (or corners in installations), generally more at the cable level or for fibers. The macro bend loss occurs when the fiber cable is subjected to a significant amount of bending above a critical value of curvature. The macro bend loss is also called as large radius loss.

The term "coating induced micro bend loss" as used herein refers to losses caused by multiple coatings surrounding the cladding. The coating induced micro bend loss is only for coating part of the optical fiber while in general micro bend loss is a value for entire optical fiber.

The term "Zero Dispersion Wavelength (ZDW)" as used herein refers to a wavelength at which the value of dispersion coefficient is zero. In general, ZDW is the wavelength at which material dispersion and waveguide dispersion cancel one another.

Figure 1A:
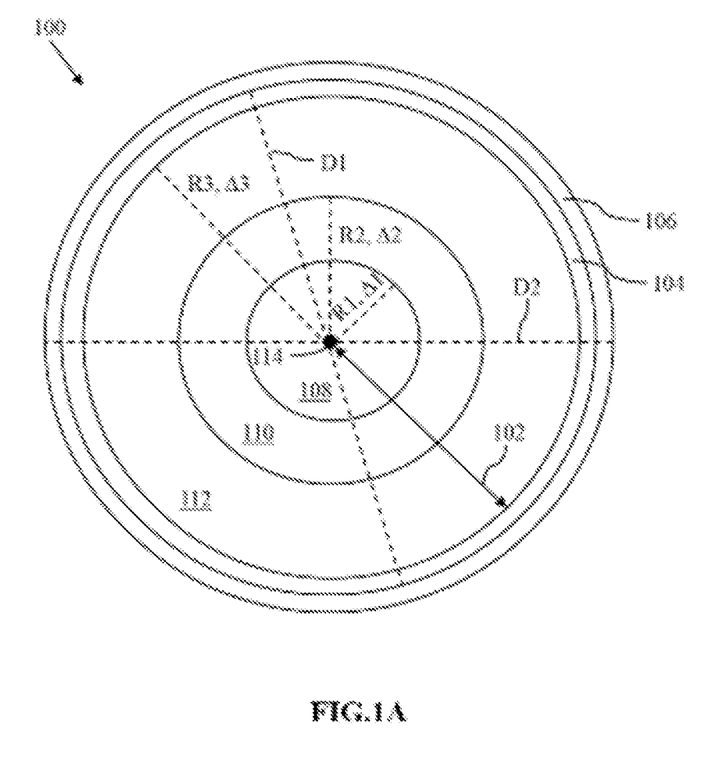
FIG. 1A is a pictorial snapshot illustrating a cross-sectional view of an optical fiber in accordance with an embodiment of the present invention.

FIG. 1A is a pictorial snapshot illustrating a cross-sectional view of an optical fiber 100. The optical fiber 100 has a reduced diameter fiber and improved micro bending performance. The improved micro bending performance is achieved by reducing a leakage loss by waveguide refractive index profile and optimizing a thickness of coatings. The optimized combination of fiber design and coatings significantly improve optical loss from bends of the optical fiber 100 thus providing an optimized fiber product to minimize optical power loss and maximize network performance.

In accordance with an embodiment of the present invention, the optical fiber 100 has a silica region 102, a first coating 104, and a second coating 106. The silica region 102 has traces of at least one carbon group element and at least one halogen group element. In particular, the silica region 102 has Germanium (GE) (i.e., a carbon group element) and Fluorine (F) (i.e., a halogen group element) in predefined concentrations. Further, the silica region 102 has a core 108, a trench layer 110, and a cladding 112. Furthermore, the silica region 102 have a diameter in a range of 60 μm to 100 μm.

The optical fiber 100 has a central axis 114 such that the core 108 is arranged along the central axis 114 running longitudinally, i.e., generally parallel to the central axis 114. The core 108 is positioned approximately at a center of the optical fiber 100.

In accordance with an embodiment of the present invention, the core 108 has a radius R1 and a refractive index Δ1, the trench layer 110 has a radius R2 and a refractive index Δ2 and the cladding 112 has a radius R3 and a refractive index Δ3. In particular, the radius R1 of the core 108 is in a range of 4.2 micrometers (μm) to 4.8 μm. Moreover, the refractive index Δ1 of the core 108 is in a range of 0.36 to 0.4.

In an exemplary example, the radius R1 of the core 108 is 4.5 μm. And, the refractive index Δ1 of the core 108 is 0.39.

Further, the radius R2 of the trench layer 110 is in a range of 9 μm to 11 μm. And, the refractive index Δ2 of the trench layer 110 is in a range of −0.08 to −0.12.

In an exemplary example, the radius R2 of the trench layer 110 is 10.3 μm. and the refractive index Δ2 of the trench layer 110 is −0.1.

In some aspects of the present invention, the predefined concentrations of the Germanium (Ge) and Fluorine (F) is directly proportional to the refractive indexes Δ1 and A2 of the core 108 and the trench layer 110 respectively.

In an exemplary embodiment, if the Ge concentration increases, the refractive index Δ1 of the core 108 increases in an upward (i.e., positive) direction as compared to the refractive index of pure silica, because Ge is an up dopant. In another exemplary embodiment, if F concentration increases, the refractive index Δ2 of the trench layer 110 increases in a downward (i.e., negative) direction as compared to the refractive index of pure silica., because F is a down dopant.

Furthermore, the radius R3 of the cladding 112 is approximately 40±0.35 µm. In an exemplary example, the radius R3 of the cladding 112 is 40 µm.

In accordance with an embodiment of the present invention, at a wavelength of 1310 nanometers (nm), the optical fiber 100 has a Mode Field Diameter (MFD) of approximately 8.6±0.4. In an exemplary embodiment, at the wavelength of 1310 nm, the optical fiber 100 has the MFD of approximately 8.81.

In accordance with an embodiment of the present invention, the optical fiber 100 has a Zero Dispersion Wavelength in a range of 1300 to 1324 nm. In an exemplary embodiment, the ZDW of the optical fiber 100 is 1302 nm.

In accordance with an embodiment of the present invention, the optical fiber 100 has a Cable Cut off (CC) that is less than 1260 nm. In an exemplary embodiment, the CC of the optical fiber 100 is 1234 nm.

In accordance with an embodiment of the present invention, the optical fiber 100, at a wavelength of 1550 nm and with a bend radius of 7.5 mm, 1 turn, have a macro bend loss that is less than or equal to 0.5 dB. In an exemplary embodiment, the optical fiber 100, at the wavelength of 1550 nm and with the bend radius of 7.5 mm, 1 turn, have the macro bend loss of 0.177 dB. Similarly, the optical fiber 100, at the wavelength of 1625 nm and with the bend radius of 7.5 mm, 1 turn, have the macro bend loss that is less than or equal to 1 dB. Further, the optical fiber 100, at the wavelength of 1625 nm and with the bend radius of 7.5 mm, 1 turn, have the macro bend loss of 0.449 dB.

The optical fiber 100, at the wavelength of 1550 nm and with a bend radius of 10 mm, 1 turn, have the macro bend loss that is less than 0.1 dB. In an exemplary embodiment, the optical fiber 100, at the wavelength of 1550 nm and with the bend radius of 10 mm, 1 turn, have the macro bend loss of 0.02 dB. Similarly, the optical fiber 100, at the wavelength of 1625 nm and with the bend radius of 10 mm, 1 turn, have the macro bend loss that is less than 1 dB. Further, the optical fiber 100, at the wavelength of 1625 nm and with the bend radius of 10 mm, 1 turn, the macro bend loss of 0.076 dB.

The optical fiber 100, at the wavelength of 1550 nm and with a bend radius of 15 mm, 10 turns, have the macro bend loss that is less than 0.03 dB. In an exemplary embodiment, the optical fiber 100, at the wavelength of 1550 nm and with the bend radius of 15 mm, 10 turns, have the macro bend loss of 0.002 dB. Similarly, the optical fiber 100, at the wavelength of 1625 nm and with the bend radius of 15 mm, 10 turns, have the macro bend loss that is less than 0.1 dB. Further, the optical fiber 100, at the wavelength of 1625 nm and with the bend radius of 15 mm, 10 turns, the macro bend loss of 0.014 dB. The optical fiber 100, at the wavelength of 1550 nm, has leakage losses that is less than 0.001 Decibels/Kilometers (dB/km).

In accordance with an embodiment of the present invention, the optical fiber 100, at the wavelength of 1550 nm, has leakage losses of 0.000000871 dB/km. At a wavelength of 1550 nm, the optical fiber 100 have a leakage loss that is less than the leakage loss at the wavelength of 1625 nm. Specifically, at the wavelength of 1625 nm, the leakage loss is less than 0.001 dB/km. Preferably, the optical fiber 100, at the wavelength of 1625 nm, have leakage losses of 0.000001564 dB/km.

In accordance with an embodiment of the present invention, the first coating 104 cover an outer circumference of the silica region 102. In particular, the first coating 104 cover an outer circumference of the cladding 112. Moreover, the second coating 106 cover an outer circumference of the first coating 104. Further, the first coating 104 have a first diameter D1 in a range of 116 µm to 155 µm and a first Young's modulus in a range of 0.0001 Gigapascal (GPa) to 0.0004 GPa. In an exemplary example, the first Young's modulus is 0.0002 GPa.

The second coating 106 has a second diameter D2 in a range of 140 µm to 180 µm and a second Young's modulus in a range of 1.3 GPa to 3 GPa. In an exemplary example, the second Young's modulus is 2.2 GPa. Specifically, by virtue of the second coating 106 having the second diameter D2, the optical fiber 100 have the second diameter D2 that is less than or equal to 180 µm. Preferably, the second diameter D2 is 160 µm.

In some aspects of the present invention, a ratio of the second diameter to the first diameter is in a range of 1.05 to 1.45.

In accordance with an embodiment of the present invention, the first coating 104 and second coating 106 is adapted to induce a micro bend loss in the optical fiber 100. The micro bend loss induced by the first coating 104 and second coating 106 is given by coating induced micro bend loss that is determined by an equation as given below:

$$\frac{K_p^2}{BR_g^2 * DR_s^{0.375} * BR_s^{0.625}}$$

Wherein, $$\frac{K_p^2}{BR_g^2 * DR_s^{0.375} * BR_s^{0.625}}$$

$$K_p = \frac{E_p D_g}{t_p}$$

$$BR_g = \frac{\pi}{4} E_g \left(\frac{D_g}{2}\right)^4$$

$$DR_s = E_p + \left(\frac{t_s}{R_s}\right)^3 E_s$$

$$BR_s = \frac{\pi}{4} E_s \left(R_s^4 - R_p^4\right)$$

where, K is spring constant (MPa),
BR is bending rigidity (MPa·mm⁴),
DR is deformation resistance (MPa),
T is thickness (mm),
R and D is Radius (mm) and Diameter (mm), respectively,
E is Young's modulus (MPa), and
Subscripts g, p, s denote glass region, first coating (primary coating), and second coating, respectively.
where, $K_p$ represents spring constant of the first (primary) coating which is the ratio of product of Young's modulus of first (primary) coating and diameter of glass region to the thickness of the first (primary) coating.
$BR_g$ represents bending rigidity or bending resistance of the glass region which is a function of Youngs modulus of the glass region and diameter of the glass region.
$DR_s$ represents deformation rigidity or deformation resistance of the second coating upon external force. It is a function of Young's modulus of the first (primary) coating, thickness of the second coating and Young's modulus of the second coating.
$BR_s$ represents bending rigidity or bending resistance of the second coating which is a function of Young's modulus of the second coating, radius of first and second coating.

In an exemplary aspect of the present invention, when the radius R3 of the cladding 112 is 40 µm, the diameter D1 of the first coating 104 is in a range of 145 µm to 155 µm, the diameter D2 of the second coating 106 is 180 µm, the first Young's modulus associated with the first coating 104 is 0.0002 GPa, and the second Young's modulus associated with the second coating 106 is 2.2 GPa, in such an aspect of the present invention, a coating induced micro bend loss of the optical fiber 100 is $0.023 \times 10^3$ $N^{-1}$ $mm^{-8.5}$.

In another exemplary aspect of the present invention, when the radius R3 of the cladding 112 is 40 µm, the diameter D1 of the first coating 104 is in a range of 145 µm to 155 µm, the diameter D2 of the second coating 106 is 180 µm, the first Young's modulus associated with the first coating 104 is 0.0004 GPa, and the second Young's modulus associated with the second coating 106 is 1.3 GPa, in such an aspect of the present invention, the coating induced micro bend loss of the optical fiber 100 is $0.15 \times 10^3$ $N^{-1}$ $mm^{-8.5}$.

In yet another exemplary aspect of the present invention, when the radius R3 of the cladding 112 is 40 µm, the diameter D1 of the first coating 104 is 135 µm, the diameter D2 of the second coating 106 is 160 µm, the first Young's modulus associated with the first coating 104 is 0.0002 GPa, and the second Young's modulus associated with the second coating 106 is 2.2 GPa, in such an aspect of the present invention, the coating induced micro bend loss of the optical fiber 100 is $0.05 \times 10^3$ $N^{-1}$ $mm^{-8.5}$.

In yet another exemplary aspect of the present invention, when the radius R3 of the cladding 112 is 40 µm, the diameter D1 of the first coating 104 is 135 µm, the diameter D2 of the second coating 106 is 160 µm, the first Young's modulus associated with the first coating 104 is 0.0004 GPa, and the second Young's modulus associated with the second coating 106 is 1.3 GPa, in such an aspect of the present invention, the coating induced micro bend loss of the optical fiber 100 is $0.37 \times 10^3$ $N^{-1}$ $mm^{-8.5}$.

In yet another exemplary aspect of the present invention, when the radius R3 of the cladding 112 is 40 µm, the diameter D1 of the first coating 104 is 120 µm, the diameter D2 of the second coating 106 is 140 µm, the first Young's modulus associated with the first coating 104 is 0.0002 GPa, and the second Young's modulus associated with the second coating 106 is 2.2 GPa, in such an aspect of the present invention, the coating induced micro bend loss of the optical fiber 100 is $0.17 \times 10^3$ $N^{-1}$ $mm^{-8.5}$.

In yet another exemplary aspect of the present invention, when the radius R3 of the cladding 112 is 40 µm, the diameter D1 of the first coating 104 is in a range o 120 µm, the diameter D2 of the second coating 106 is 140 µm, the first Young's modulus associated with the first coating 104 is 0.0004 GPa, and the second Young's modulus associated with the second coating 106 is 1.3 GPa, in such an aspect of the present invention, the coating induced micro bend loss of the optical fiber 100 is $1.14 \times 10^3$ $N^{-1}$ $mm^{-8.5}$.

In accordance with an embodiment of the present invention, the first coating 104 and the second coating 106 are adapted to induce the micro bend loss (i.e., coating induced micro bend loss) less than $2.2 \times 10^3$ $N^{-1}$ $mm^{-8.5}$. In particular, the first coating 104 and the second coating 106 employed for protection of the silica region 102 have a significant role in the micro bending sensitivity of the optical fiber 100. Further, the micro bend loss of the optical fiber 100 decreases by combining the first coating 104 (i.e., a primary coating) having a lower Young's modulus with the second coating 106 (i.e., a secondary coating) having a higher Young's modulus to enhance micro bending performance.

Figure 1B:
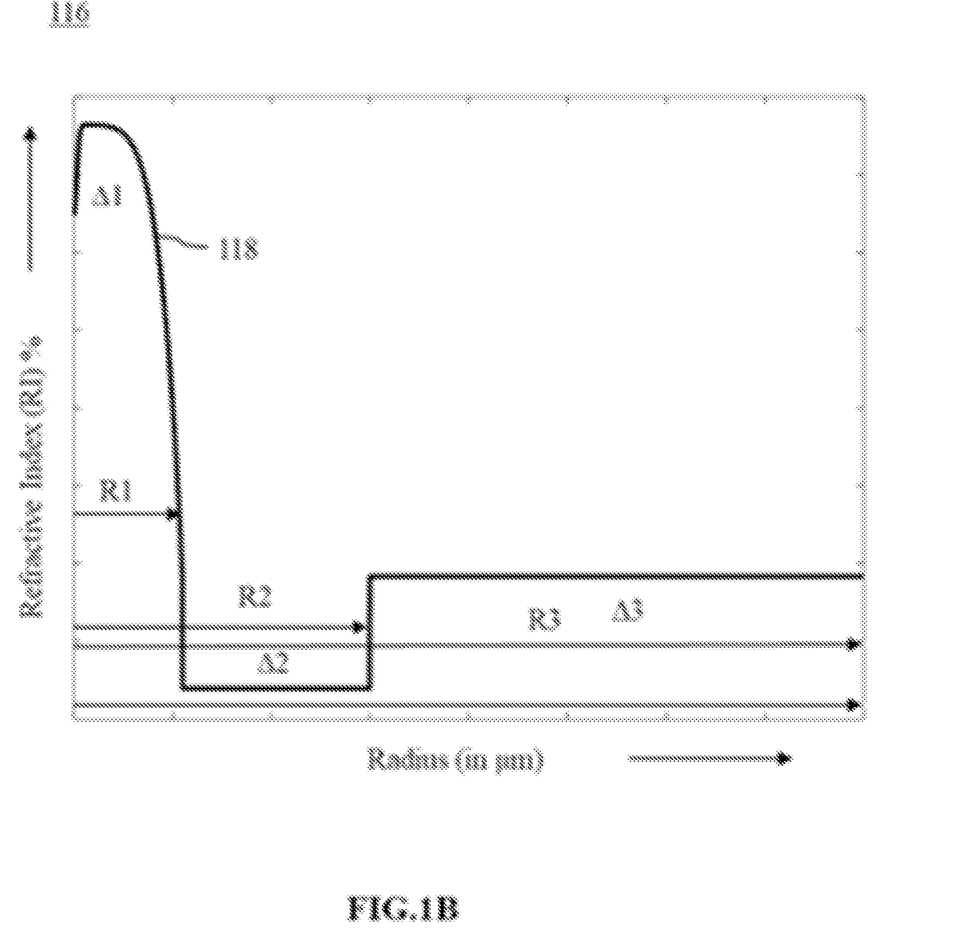
FIG. 1B is a graphical representation illustrating a refractive index (RI) profile of the optical fiber in accordance with an embodiment of the present invention.

FIG. 1B is a graph 116 illustrating a refractive index (RI) profile of the optical fiber 100. The X-axis and Y-axis of the graph 116 denotes various radiuses associated with the optical fiber 100 and various refractive indexes (RI) associated with the optical fiber 100. Further, the graph 116 has a curve 118. The curve 118, near the centre of the optical fiber 100 i.e., when the radius R1 of the core 108 (is minimal, the refractive index Δ1 of the core 108 peaks. Further, as the radius R1 of the core 108 increases i.e., moving away from the centre of the optical fiber 100, the refractive index Δ1 of the core 108 dips. Furthermore, the refractive index Δ1 of the core 108 is maximum near the centre of the optical fiber 100 and minimum near a transition point between the core 108 and the trench layer 110. The trench layer 110 have a linear refractive index Δ2 less than the refractive index Δ1 of the core 108. And, the cladding 112 have a linear refractive index Δ3 which is greater than the refractive index Δ2 of the trench layer 110.

Figure 1C:
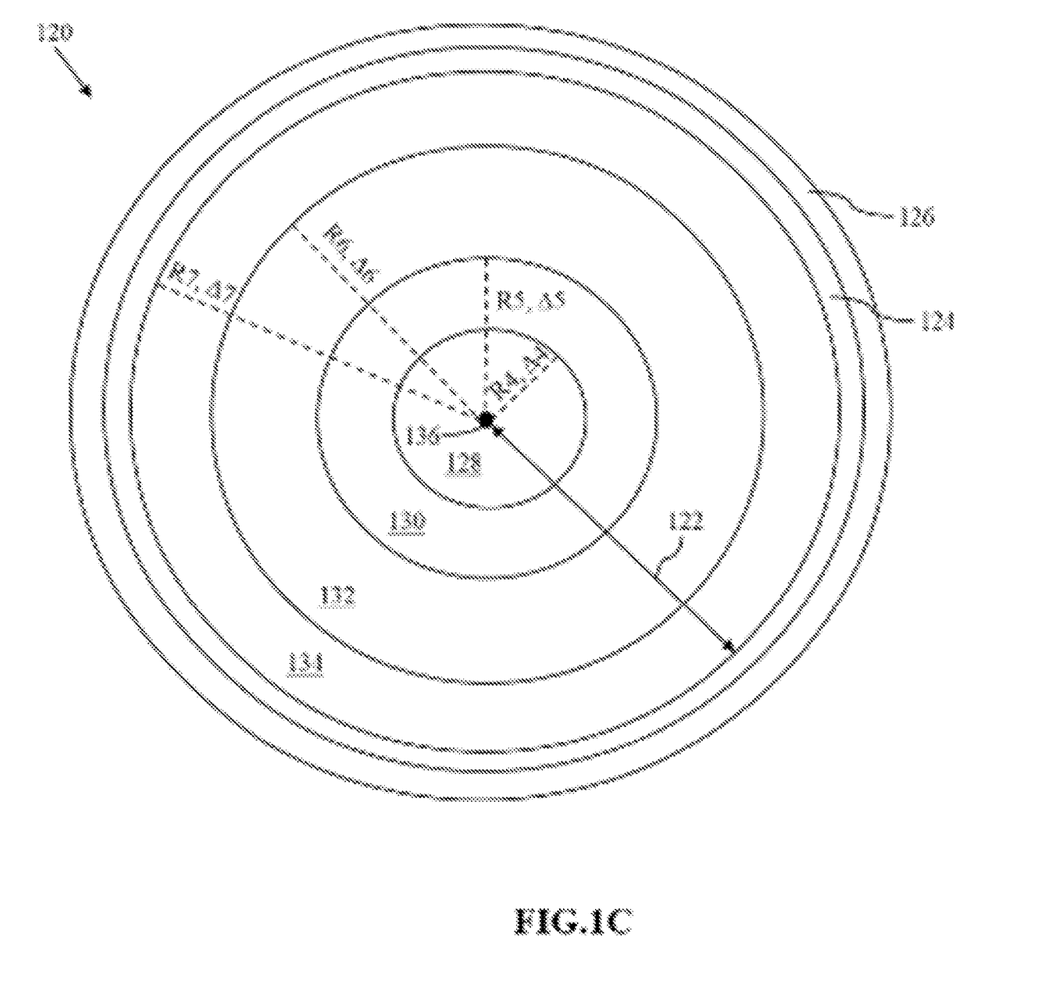
FIG. 1C is a pictorial snapshot illustrating a cross-sectional view of an optical fiber in accordance with another embodiment of the present invention.

FIG. 1C is a pictorial snapshot illustrating a cross-sectional view of another optical fiber 120. The optical fiber 120 comprises a silica region 122, a first coating 124, and a second coating 126. The silica region 122 have a diameter in a range of 60 µm to 100 µm and have traces of at least one carbon group element and at least one halogen group element.

In an aspect of the present invention, the silica region 122 has a core 128, a buffer layer 130, a trench layer 132, and a cladding 134. The optical fiber 120 have a central axis 136 such that the core 128 is arranged along the central axis 136 running longitudinally, i.e., generally parallel to the central axis 136. The core 128 is a cylindrical fiber that runs along a length of the optical fiber 120 and is configured to guide an optical signal. Further, the buffer layer 130 cover an outer circumference of the core 128, the trench layer 132 cover an outer circumference of the buffer layer 130, and the cladding 134 cover an outer circumference of the trench layer 132.

The core 128 have a radius R4 and a refractive index Δ4, the buffer layer 130 have a radius R5 and a refractive index Δ5, the trench layer 132 have a radius R6 and a refractive index Δ6, and the cladding 134 have a radius R7 and a refractive index Δ7.

In one aspect of the present invention, for the core 128, the radius R4 is in a range of 3.5 µm to 4.2 µm and the refractive index Δ4 is in a range of 0.35 to 0.45. For the buffer layer 130, the radius R5 is in a range of 3.5 µm to 4.2 µm and the refractive index Δ5 is in a range of −0.05 to 0.05. For the trench layer 132, the radius R6 is in a range of 6.5 µm to 8 µm and the refractive index Δ6 is in a range of −0.28 to −0.35. For the cladding 134, the radius R7 is 40±0.35 µm and the refractive index Δ7 is in a range of −0.05 to 0.05.

In some aspects of the present invention, the predefined concentrations of the Germanium (Ge) and Fluorine (F) is directly proportional to the refractive indexes Δ4 and Δ6 of the core 128 and the trench layer 132 respectively. For example, if the Ge concentration increases, the refractive index Δ4 of the core 128 increases in an upward (i.e., positive) direction as compared to the refractive index of pure silica, because Ge is an up dopant. In another example, if F concentration increases, the refractive index Δ6 of the trench layer 132 increases in a downward (i.e., negative) direction as compared to the refractive index of pure silica, because F is a down dopant.

The MFD of the optical fiber 120 at a wavelength of 1310 nm is equal to 8.6±0.4 µm, the ZDW of the optical fiber 120 is in a range of 1300 nm to 1324 nm, the CC of the optical fiber 120 is less than or equal to 1260 nm. Further, at a wavelength of 1550 nm and with a bend radius of 7.5 mm, 1 turn, a macro bend loss in the optical fiber 120 is less than or equal to 0.2 dB and at a wavelength of 1625 nm and with the bend radius of 7.5 mm, 1 turn, the macro bend loss in the optical fiber 120 is less than or equal to 0.5 dB.

At the wavelength of 1550 nm and with a bend radius of 10 mm, 1 turn, the macro bend loss in the optical fiber 120 is e less than or equal to 0.1 dB and at the wavelength of 1625 nm and with the bend radius of 10 mm, 1 turn, the macro bend loss in the optical fiber 120 is less than or equal to 0.2 dB. At the wavelength of 1550 nm and with a bend radius of 15 mm, 10 turns, the macro bend loss in the optical fiber 120 is less than or equal to 0.03 dB and at the wavelength of 1625 nm and with the bend radius of 15 mm, 10 turns, the macro bend loss in the optical fiber 120 is less than or equal to 0.1 dB/turn.

In accordance with an embodiment of the present invention, the first coating 124 and the second coating 126 are structurally and functionally similar to the first coating 104 and the second coating 106, respectively. Particularly, the first coating 124 and the second coating 126 are adapted to induce the micro bend loss (i.e., coating induced micro bend loss) that is less than $2.2 \times 10^3 \, N^{-1} \, mm^{-8.5}$. The first coating 124 and the second coating 126 employed for protection of the silica region 122 have a significant role in the micro bending sensitivity of the optical fiber 120. The micro bend loss of the optical fiber 120 decreases by combining the first coating 124 (i.e., a primary coating) having a lower Young's modulus with the second coating 126 (i.e., a secondary coating) having a higher Young's modulus to enhance micro bending performance.

Moreover, the first coating 124 and second coating 126 is adapted to induce a micro bend loss in the optical fiber 120. The micro bend loss induced by the first coating 124 and second coating 126 is given by coating induced micro bend loss that is determined by an equation as given below:

$$\frac{K_p^2}{BR_g^2 * DR_s^{0.375} * BR_s^{0.625}}$$

Wherein, $$\frac{K_p^2}{BR_g^2 * DR_s^{0.375} * BR_s^{0.625}}$$

$$K_p = \frac{E_p D_g}{t_p}$$

$$BR_g = \frac{\pi}{4} E_g \left(\frac{D_g}{2}\right)^4$$

$$DR_s = E_p + \left(\frac{t_s}{R_s}\right)^3 E_s$$

$$BR_s = \frac{\pi}{4} E_s (R_s^4 - R_p^4)$$

where, K is spring constant (MPa),
BR is bending rigidity (MPa·mm$^4$),
DR is deformation resistance (MPa),
T is thickness (mm),
R and D is Radius (mm) and Diameter (mm), respectively,
E is Young's modulus (MPa), and
Subscripts g, p, s denote glass region, first coating (primary coating), and second coating, respectively.

where, $K_p$ represents spring constant of the first (primary) coating which is the ratio of product of Young's modulus of first (primary) coating and diameter of glass region to the thickness of the first (primary) coating.

$BR_g$ represents bending rigidity or bending resistance of the glass region which is a function of Youngs modulus of the glass region and diameter of the glass region.

$DR_s$ represents deformation rigidity or deformation resistance of the second coating upon external force. It is a function of Young's modulus of the first (primary) coating, thickness of the second coating and Young's modulus of the second coating.

$BR_s$ represents bending rigidity or bending resistance of the second coating which is a function of Young's modulus of the second coating, radius of first and second coating.

Figure 1D:
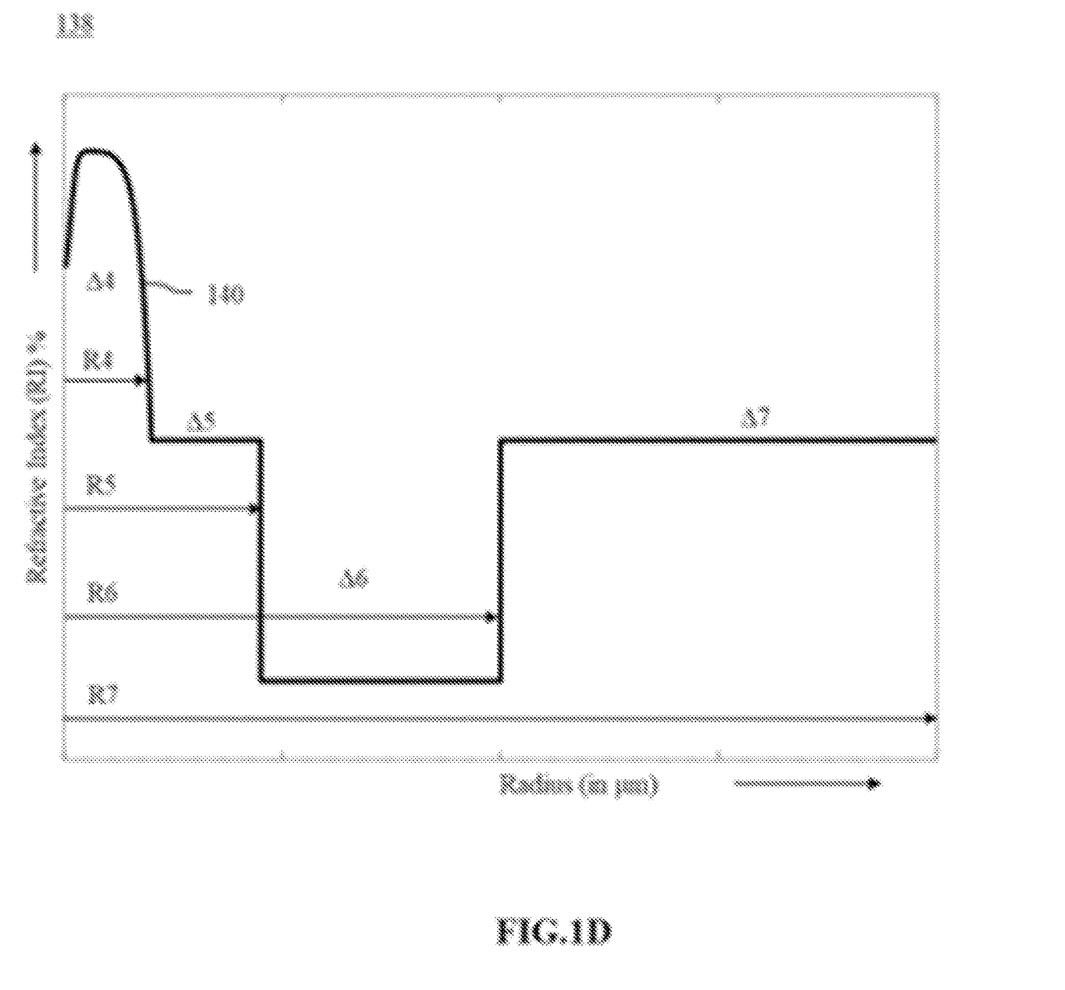
FIG. 1D is a graphical representation illustrating a refractive index (RI) profile of the optical fiber in accordance with another embodiment of the present invention.

FIG. 1D illustrates a graph 138 of a refractive index (RI) profile of the optical fiber 120. X-axis and Y-axis of the graph 138 denotes various radiuses associated with the optical fiber 120 and various refractive indexes (RI) associated with the optical fiber 120, respectively. The graph 138 has a curve 140. As illustrated by the curve 140, near the center of the optical fiber 120 i.e., the refractive index Δ4 of the core 128 is maximum. Further, as the radius R4 of the core 128 increases i.e., moving away from the center of the optical fiber 120, the refractive index Δ4 of the core 128 dips. The refractive index Δ4 of the core 128 is minimum near a transition point between the core 128 and the buffer layer 130. The buffer layer 130 have a linear refractive index Δ5 that is less than the refractive index Δ4 of the core 128. And, the trench layer 132 have a linear refractive index Δ6 that is less than the refractive index Δ5 of the buffer layer 130. Furthermore, as illustrated, the cladding 134 have a linear refractive index Δ7 which is greater than the refractive index Δ6 of the trench layer 132 and less than the refractive index Δ5 of the buffer layer 130.

Figure 1E:
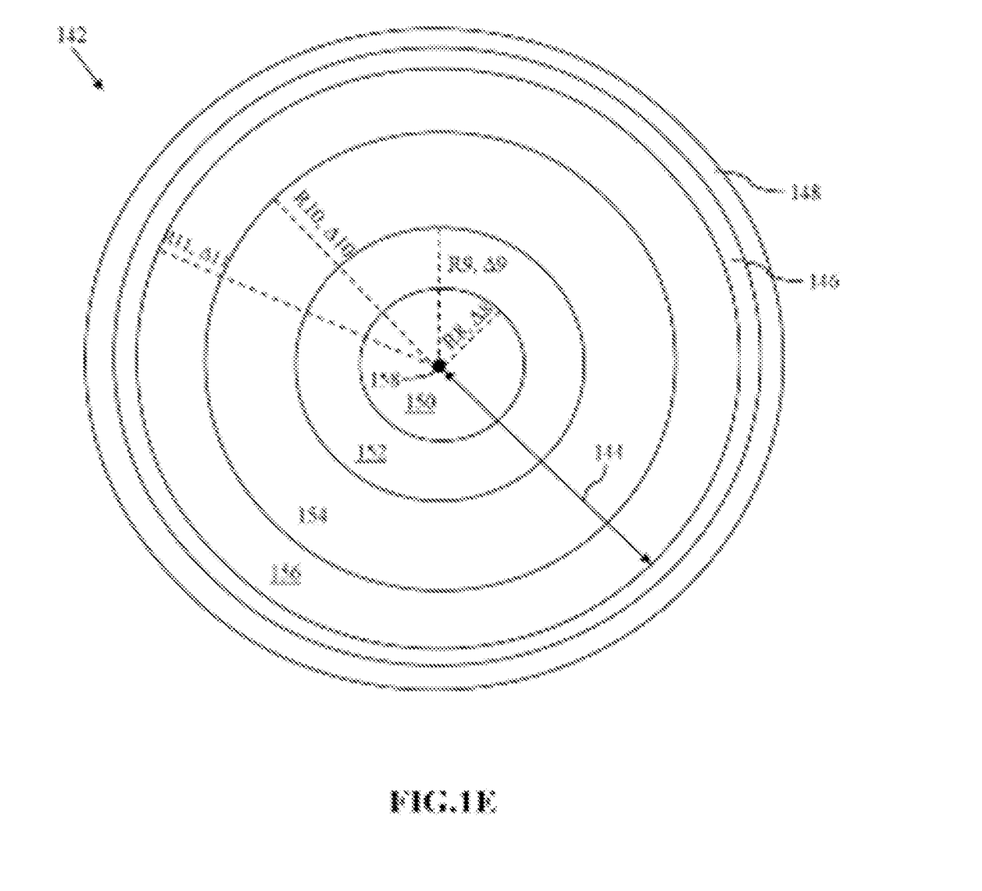
FIG. 1E is a pictorial snapshot illustrating a cross-sectional view of an optical fiber in accordance with yet another embodiment of the present invention.

FIG. 1E illustrates a cross-sectional view of yet another optical fiber 142 in accordance with an embodiment of the present invention. The optical fiber 142 have a silica region 144, a first coating 146, and a second coating 148. The silica region 144 have a diameter in a range of 60 µm to 100 µm. The silica region 144 has traces of at least one carbon group element and at least one halogen group element. In particular, the silica region 144 has Germanium (GE) (i.e., a carbon group element) and Fluorine (F) (i.e., a halogen group element) in predefined concentrations. In an aspect of the present invention, the silica region 144 has a core 150, a buffer layer 152, a trench layer 154, and a cladding 156.

In accordance with an embodiment of the present invention, the optical fiber 142 have a central axis 158 such that the core 150 is arranged along the central axis 158 running longitudinally, i.e., generally parallel to the central axis 158. The core 150 is positioned approximately at the center of the optical fiber 142. The core 150 is a cylindrical fiber that run along a length of the optical fiber 142 and is configured to guide an optical signal. The buffer layer 152 covers an outer circumference of the core 150, the trench layer 154 cover an outer circumference of the buffer layer 152, and the cladding 156 cover an outer circumference of the trench layer 154.

In accordance with an embodiment of the present invention, for simulation of the leakage losses in the optical fiber 142 at different values of diameter of the cladding 156, the optical fiber 142 is fabricated with below mentioned input parameters. In an exemplary aspect of the present invention, for the core 150, the radius R8 is in a range of 3.8 µm to 4.2 µm, the refractive index Δ8 is in a range of 0.35 to 0.45 and a core alpha is in a range of 4 to 7. For the buffer layer 152, the radius R9 is in a range of 8 µm to 9 µm and the refractive index Δ9 is in a range of −0.05 to 0.05. For the trench layer 154, the radius R10 is in a range of 14 µm to 15.5 µm, the refractive index Δ10 is in a range of −0.0028 to −0.0035, and a trench alpha is in a range of 5 to 8. For the cladding 156, the radius R11 is in a range of 79.3 µm to 80.7 µm, the refractive index Δ11 is in a range of −0.02 to 0.02. In some aspects of the present invention, the predefined concentrations of the Germanium (Ge) and Fluorine (F) is directly proportional to the refractive indexes Δ8 and A10 of the core 150 and the trench layer 154 respectively.

For example, if the Ge concentration increases, the refractive index Δ8 of the core 150 increases in an upward (i.e., positive) direction as compared to the refractive index of pure silica, because Ge is an up dopant. In another example, if F concentration increases, the refractive index Δ10 of the trench layer 154 increases in a downward (i.e., negative) direction as compared to the refractive index of pure silica, because F is a down dopant. In relation to the above aspect of the invention, the MFD of the optical fiber 142 at a wavelength of 1310 nm is equal to 8.6±0.4 µm, the ZDW of the optical fiber 142 is in a range of 1300 nm to 1324 nm, the CC of the optical fiber 142 is less than or equal to 1260 nm. Further, at a wavelength of 1550 nm and with a bend radius of 7.5 mm, 1 turn, a macro bend loss in the optical fiber 142 is less than or equal to 0.2 dB and at the wavelength of 1625 nm and with the bend radius of 7.5 mm, 1 turn, the macro bend loss in the optical fiber 142 is less than or equal to 0.5 dB. At the wavelength of 1550 nm and with a bend radius of 10 mm, 1 turn, the macro bend loss in the optical fiber 142 is less than or equal to 0.1 dB and at the wavelength of 1625 nm and with the bend radius of 10 mm, 1 turn, the macro bend loss in the optical fiber 142 is less than or equal to 0.2 dB.

At the wavelength of 1550 nm and with a bend radius of 15 mm, 10 turns, the macro bend loss in the optical fiber 142 is less than or equal to 0.03 dB and at the wavelength of 1625 nm and with the bend radius of 15 mm, 10 turn, the macro bend loss in the optical fiber 142 is less than or equal to 0.1 dB. The first coating 146 and the second coating 148 is structurally and functionally similar to the first coating 104 and the second coating 106, respectively.

In accordance with an embodiment of the present invention, the first coating 146 and the second coating 148 is adapted to induce the micro bend loss (i.e., coating induced micro bend loss) that is less than $2.2 \times 10^3$ N$^{-1}$ mm$^{-8.5}$. The first coating 146 and the second coating 148 employed for protection of the silica region 144 have a significant role in the micro bending sensitivity of the optical fiber 142. The micro bend loss of the optical fiber 142 decrease by combining the first coating 146 (i.e., a primary coating) having a lower modulus with the second coating 148 (i.e., a secondary coating) having a higher modulus to enhance micro bending performance.

In accordance with an embodiment of the present invention, the first coating 146 and second coating 148 is adapted to induce a micro bend loss in the optical fiber 142. The micro bend loss induced by the first coating 146 and second coating 148 is given by coating induced micro bend loss that is determined by an equation as given below:

$$\frac{K_p^2}{BR_g^2 * DR_s^{0.375} * BR_s^{0.625}}$$

Wherein, $$\frac{K_p^2}{BR_g^2 * DR_s^{0.375} * BR_s^{0.625}}$$

$$K_p = \frac{E_p D_g}{t_p}$$

$$BR_g = \frac{\pi}{4} E_g \left(\frac{D_g}{2}\right)^4$$

$$DR_s = E_p + \left(\frac{t_s}{R_s}\right)^3 E_s$$

$$BR_s = \frac{\pi}{4} E_s (R_s^4 - R_p^4)$$

where, K is spring constant (MPa),
BR is bending rigidity (MPa·mm$^4$),
DR is deformation resistance (MPa),
T is thickness (mm),
R and D is Radius (mm) and Diameter (mm), respectively,
E is Young's modulus (MPa), and
Subscripts g, p, s denote glass region, first coating (primary coating), and second coating, respectively.
where, $K_p$ represents spring constant of the first (primary) coating which is the ratio of product of Young's modulus of first (primary) coating and diameter of glass region to the thickness of the first (primary) coating.
$BR_g$ represents bending rigidity or bending resistance of the glass region which is a function of Youngs modulus of the glass region and diameter of the glass region.
$DR_s$ represents deformation rigidity or deformation resistance of the second coating upon external force. It is a function of Young's modulus of the first (primary) coating, thickness of the second coating and Young's modulus of the second coating.
$BR_s$ represents bending rigidity or bending resistance of the second coating which is a function of Young's modulus of the second coating, radius of first and second coating.

Figure 1F:
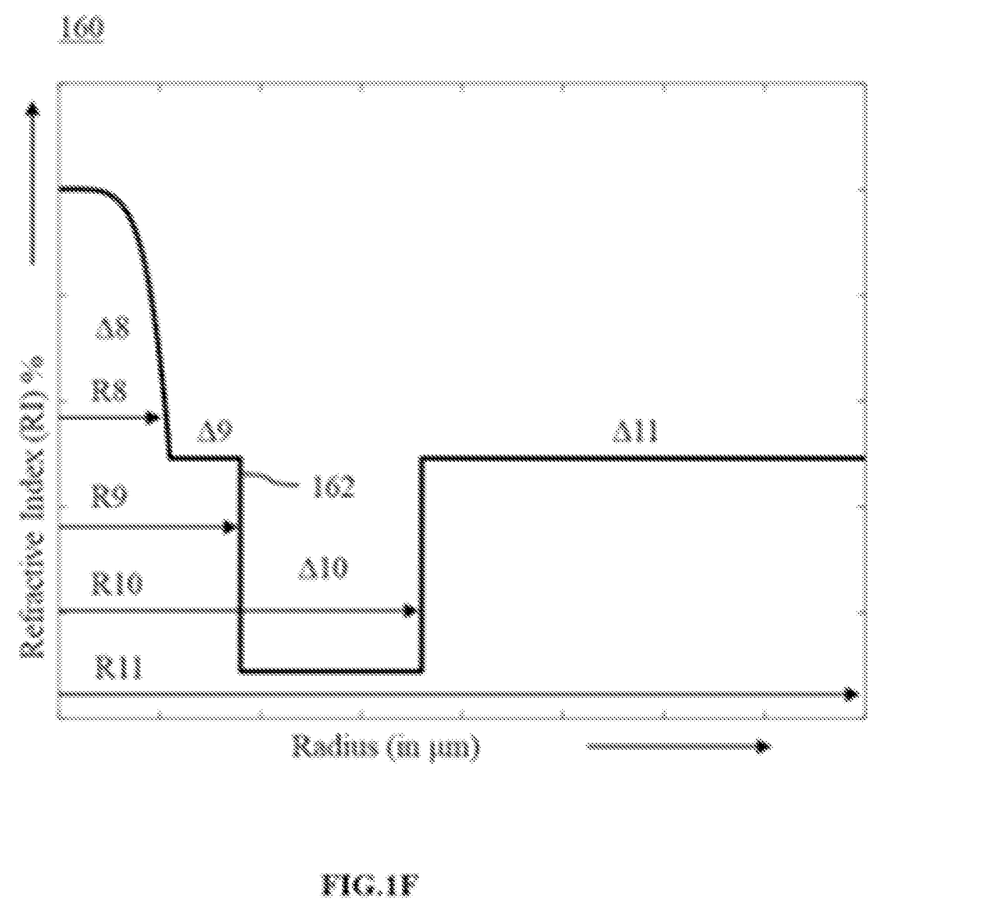
FIG. 1F is a graphical representation illustrating a refractive index (RI) profile of the optical fiber in accordance with yet another embodiment of the present invention.

FIG. 1F illustrates a graph 160 of a refractive index (RI) profile of the optical fiber 142 in accordance with an embodiment of the present invention. X-axis and Y-axis of the graph 160 denotes various radiuses associated with the optical fiber 142 and various refractive indexes (RI) associated with the optical fiber 142, respectively. The graph 160 has a curve 162. Near the center of the optical fiber 142, the refractive index Δ8 of the core 150 is maximum. Further, as the radius R8 of the core 150 increases i.e., moving away from the center of the optical fiber 142, the refractive index Δ8 of the core 150 dips. Moreover, the refractive index Δ8 of the core 150 is minimum near a transition point between the core 150 and the buffer layer 152. Further, as illustrated, the buffer layer 152 have a linear refractive index Δ9 that is less than the refractive index Δ8 of the core 150. Furthermore, as illustrated, the trench layer 154 have a linear refractive index Δ10 that is less than the refractive index Δ9 of the buffer layer 152. The cladding 156 have a linear refractive index Δ11 which is greater than the refractive index Δ10 of the trench layer 154 and less than the refractive index Δ9 of the buffer layer 152.

Figure 1G:
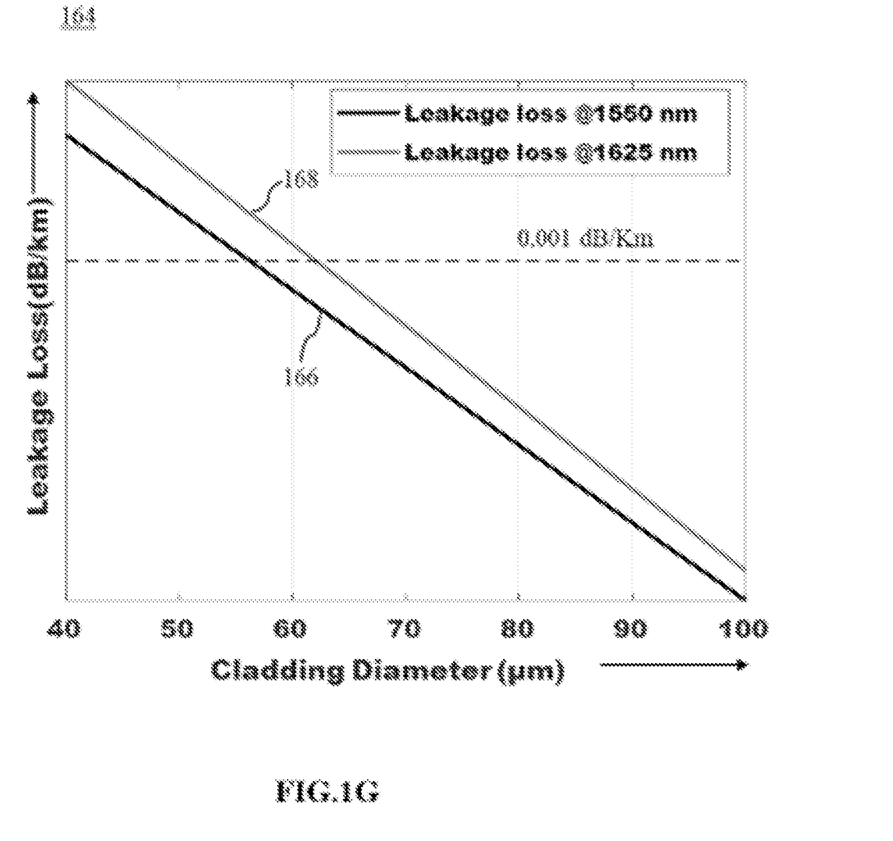
FIG. 1G is a graphical representation illustrating a graph between leakage losses and diameter of the cladding of the optical fiber in accordance with an embodiment of the present invention.

FIG. 1G illustrates a graph 164 between leakage losses and diameter of the cladding 156 of the optical fiber 142 in accordance with an embodiment of the present invention. X-axis and Y-axis of the graph 164 denote the leakage losses and the diameter of the cladding 156, respectively. The graph 164 have a first curve 166 representing the leakage loss in the optical fiber 142 at the wavelength of 1550 nm when the diameter (i.e., R11×2) of the cladding 156 is 100 µm and a second curve 168 represent the leakage loss in the optical fiber 142 at the wavelength of 1625 nm when the diameter of the cladding 156 is 100 µm. In particular, when the diameter of the cladding 156 is 100 µm, the leakage loss in the optical fiber 142 at the wavelength of 1625 nm is greater than the leakage loss in the optical fiber 142 at the wavelength of 1550 nm. Moreover, the leakage loss in the optical fiber 142 at the wavelength of 1625 nm is 0.000000758 dB/km. Thus, the optical fiber 142 have good confinement of mode in the core 150 at the wavelength of 1550 nm with the cladding 156 having the diameter of 100 µm.

The present invention provides the optical fiber 100, 120, and 142 with a reduced diameter fiber such that the diameter D2 of the optical fiber 100, 120, and 142 is less than or equal to 180 µm. The reduced diameter optical fiber 100, 120, and 142 demonstrates good micro bend performance. Specifically, by virtue of the first coating 104, 124, 146 and the second coating 106, 126, 148, the optical fiber 100, 120, and 142 demonstrates a micro bend loss that is less than $2.2 \times 10^3$ $N^{-1}$ $mm^{-8.5}$.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance suggest or render expedient, but such are intended to cover the application or implementation without departing from the spirit or scope of the claims of the present technology.

In a case that no conflict occurs, the embodiments in the present invention and the features in the embodiments is mutually combined. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical fiber (100, 120, 142) comprising:
a silica region (102, 122, 144), wherein the silica region comprising a core (108, 128, 150) defined by a core radius in a range of 3.5 µm to 4.8 µm, wherein the silica region (102, 122, 144) has a diameter in a range of 65 µm to 100 µm;
a first coating (104, 124, 146) adapted to cover an outer circumference of the silica region (102, 122, 144), wherein the first coating (104, 124, 146) has (i) a thickness of the first coating is in a range of 25 µm to 45 µm and (ii) a first Young's modulus; and
a second coating (106, 126, 148) adapted to cover an outer surface of the first coating (104, 124, 146), wherein the second coating (106, 126, 148) has (i) a second diameter is less than or equal to 180 µm and (ii) a second Young's modulus;
wherein the first coating (104, 124, 146) and the second coating (106, 126, 148) are adapted to cause a coating induced micro bend loss that is less than $2.2 \times 10^3$ N−1 mm−8.5, wherein the optical fiber (100, 120, 142) has leakage losses of less than 0.001 Decibels/Kilometers (dB/km) at a wavelength of 1550 nm.

2. The optical fiber (100, 120, 142) of claim 1, wherein the coating induced micro bend loss is determined by an equation:

$$\frac{K_p^2}{BR_g^2 * DR_s^{0.375} * BR_s^{0.625}}$$

Wherein, $$\frac{K_p^2}{BR_g^2 * DR_s^{0.375} * BR_s^{0.625}}$$

$$K_p = \frac{E_p D_g}{t_p}$$

$$BR_g = \frac{\pi}{4} E_g \left(\frac{D_g}{2}\right)^4$$

$$DR_s = E_p + \left(\frac{t_s}{R_s}\right)^3 E_s$$

$$BR_s = \frac{\pi}{4} E_s (R_s^4 - R_p^4)$$

wherein, K is spring constant (MPa),
BR is bending rigidity (MPa·mm4),
DR is deformation resistance (MPa),
T is thickness (mm),
R and D is Radius (mm) and Diameter (mm), respectively,
E is Young's modulus (MPa), and
Subscripts g, p, s denote glass, first coating, and second coating, respectively.

3. The optical fiber (100, 120, 142) of claim 1, wherein the silica region (102) comprising a core (108), a trench layer (110), and a cladding (112).

4. The optical fiber (100, 120, 142) of claim 1, wherein the silica region (122) comprising a core (128), a buffer layer (130), a trench layer (132), and a cladding (134) and the silica region (144) comprising a core (150), a buffer layer (152), a trench layer (154), and a cladding (156).

5. The optical fiber (100, 120, 142) of claim 1, wherein the first Young's modulus is in a range of 0.0001 Gigapascal (GPa) to 0.0004 GPa, and wherein the second Young's modulus is in a range of 1.3 GPa to 3 GPa.

6. The optical fiber (100, 120, 142) of claim 1, wherein a ratio of the second diameter to the first diameter is in a range of 1.05 to 1.45.

7. The optical fiber (100, 120, 142) of claim 1, wherein the optical fiber (100) has a macro bend loss of less than or equal to 0.5 dB at a wavelength of 1550 nm at a bend radius of 7.5 mm for 1 turn, wherein the optical fiber (100) has a macro bend loss of less than or equal to 1 dB at a wavelength 1625 nm at a bend radius of 7.5 mm for 1 turn, wherein the optical fiber (120, 142) has a macro bend loss of less than or equal to 0.2 dB at a wavelength of 1550 nm at a bend radius of 7.5 mm for 1 turn, wherein the optical fiber (120, 142) macro bend loss of less than or equal to 0.5 dB at a wavelength of 1625 nm at a bend radius of 7.5 mm for 1 turn, wherein the optical fiber (100) has a macro bend loss of less than or equal to 0.1 dB at a wavelength of 1550 nm a bend radius of 10 mm for 1 turn, wherein the optical fiber (100) has a macro bend loss of less than or equal to 1 dB at a wavelength 1625 nm at a bend radius of 10 mm for 1 turn, wherein the optical fiber (120, 142) has a macro bend loss of less than or equal to 0.1 dB at a wavelength of 1550 nm at a bend radius of 10 mm for 1 turn and wherein the optical fiber (120, 142) has a macro bend loss of less than or equal to 0.2 dB at a wavelength of 1625 nm at a bend radius of 10 mm for 1 turn, wherein a macro bend loss at a bend radius of 15 mm, 10 turns, and at a wavelength of 1550 nm and 1625 nm is 0.03 dB and less than 0.1 dB, respectively.

8. The optical fiber (100, 120, 142) of claim 1, wherein a leakage loss at a wavelength 1550 nm is less than a leakage loss at a wavelength 1625 nm, wherein the leakage loss at the wavelength of 1550 nm is less than 0.001 Decibels/Kilometres (dB/km).

9. The optical fiber (100, 120, 142) of claim 1, wherein the silica region (102, 122, 144) has traces of at least one carbon group element and at least one halogen group element.

10. The optical fiber (100, 120, 142) of claim 1, wherein (i) a refractive index $\Delta 1$ of a core (108) is in a range of 0.36 to 0.4, (ii) a refractive index $\Delta 4$ of a core (128) is in a range of 0.35 to 0.45, and (iii) a refractive index $\Delta 8$ of a core (150) is in a range of 0.35 to 0.45.

11. The optical fiber (100, 120, 142) of claim 1, wherein (i) a refractive index $\Delta 2$ of a trench layer (110) is in a range of −0.08 to −0.12, (ii) a refractive index $\Delta 6$ of a trench layer (132 is in a range of −0.28 to −0.35, and (iii) a refractive index $\Delta 10$ of a trench layer 12 (154) is in a range of −0.0028 to −0.0035.

12. The optical fiber (100, 120, 142) of claim 1, wherein a Zero Dispersion Wavelength (ZDW) is in a range of 1300 nm to 1324 nm.

* * * * *